US012609856B2

(12) United States Patent
Tusha et al.

(10) Patent No.: US 12,609,856 B2
(45) Date of Patent: Apr. 21, 2026

(54) MULTI-CARRIER CONNECTION DESIGN VIA INTELLIGENT EXPLOITATION OF MULTI-USER DIVERSITY IN DELAY-DOPPLER DOMAIN

(71) Applicant: ISTANBUL MEDIPOL UNIVERSITESI TEKNOLOJI TRANSFER OFISI ANONIM SIRKETI, Beykoz (TR)

(72) Inventors: Armed Tusha, Beykoz (TR); Hüseyin Arslan, Beykoz (TR)

( * ) Notice: Subject to any disclaimer, the term of this patent is extended or adjusted under 35 U.S.C. 154(b) by 0 days.

(21) Appl. No.: 18/724,314

(22) PCT Filed: Dec. 29, 2021

(86) PCT No.: PCT/TR2021/051586
§ 371 (c)(1),
(2) Date: Jun. 26, 2024

(87) PCT Pub. No.: WO2023/121584
PCT Pub. Date: Jun. 29, 2023

(65) Prior Publication Data
US 2025/0007767 A1 Jan. 2, 2025

(30) Foreign Application Priority Data
Dec. 26, 2021 (TR) ................................ 2021/021038

(51) Int. Cl.
*H04L 27/26* (2006.01)
(52) U.S. Cl.
CPC ........ *H04L 27/2639* (2013.01); *H04L 27/263* (2013.01)

(58) Field of Classification Search
CPC ..... H04L 27/00; H04L 27/26; H04L 27/2601; H04L 27/2626; H04L 27/2627; H04L 27/2628; H04L 27/2639; H04L 27/263; H04L 27/2647; H04L 27/2649; H04L 27/26532
See application file for complete search history.

(56) References Cited

U.S. PATENT DOCUMENTS 8,913,676 B2* 12/2014 Cariou .................. H04L 5/0044
                                                    375/267
9,893,922 B2*  2/2018 Rakib ................. H04L 27/2639
(Continued)

FOREIGN PATENT DOCUMENTS

CN     108770382 A    11/2018
EP       3378187 A1    9/2018
WO    2019113046 A1    6/2019

OTHER PUBLICATIONS

International Search Report for corresponding PCT/TR2021/051586, dated Jul. 27, 2022.
(Continued)

*Primary Examiner* — James M Perez
(74) *Attorney, Agent, or Firm* — EGBERT, MCDANIEL & SWARTZ, PLLC

(57) ABSTRACT

Disclosed is a multicarrier (MC) connection design via an intelligent exploitation of the multi-user diversity in delay-Doppler domain. Overall, the technology can play a key role as an enabler technology toward 5G and beyond communications systems with applications of NR-Lite, mMTC, eMBB, URLLC and SURLLC.

2 Claims, 1 Drawing Sheet

(56) References Cited

U.S. PATENT DOCUMENTS

| | | | | |
|---|---|---|---|---|
| 10,020,882 | B2 * | 7/2018 | Uysal | H04B 7/0413 |
| 11,616,676 | B1 * | 3/2023 | Patchava | H04L 5/0016 |
| | | | | 375/262 |
| 12,155,593 | B2 * | 11/2024 | Patchava | H04L 25/0226 |
| 12,184,468 | B2 * | 12/2024 | Hadani | H04L 27/2697 |
| 12,355,686 | B2 * | 7/2025 | Sakhnini | H04L 27/2636 |
| 12,388,680 | B2 * | 8/2025 | Priya | H04B 17/364 |
| 12,519,685 | B2 * | 1/2026 | Tusha | H04L 27/2639 |
| 2009/0052577 | A1 * | 2/2009 | Wang | H04L 1/0643 |
| | | | | 375/299 |
| 2017/0012749 | A1 * | 1/2017 | Rakib | H04L 27/2639 |
| 2017/0012810 | A1 * | 1/2017 | Rakib | H04L 27/2697 |
| 2017/0033899 | A1 * | 2/2017 | Rakib | H04L 27/2655 |
| 2017/0099122 | A1 * | 4/2017 | Hadani | H04L 5/0005 |
| 2017/0099607 | A1 * | 4/2017 | Hadani | H04L 27/3488 |
| 2017/0149594 | A1 * | 5/2017 | Rakib | H04L 5/0007 |
| 2017/0149595 | A1 * | 5/2017 | Rakib | H04B 7/0617 |
| 2017/0288710 | A1 * | 10/2017 | Delfeld | H04L 5/0048 |
| 2018/0227159 | A1 * | 8/2018 | Rakib | H04L 27/2646 |
| 2018/0262306 | A1 * | 9/2018 | Hadani | H04L 5/0007 |
| 2019/0182083 | A1 * | 6/2019 | Ashrafi | H04L 25/03834 |
| 2019/0238189 | A1 * | 8/2019 | Delfeld | H04J 11/00 |
| 2020/0204410 | A1 * | 6/2020 | Hadani | H04L 25/03834 |
| 2020/0259692 | A1 * | 8/2020 | Hadani | H04L 27/18 |
| 2020/0389268 | A1 * | 12/2020 | Sathyanarayan | |
| | | | | H04L 27/26532 |
| 2021/0250138 | A1 * | 8/2021 | Ibars Casas | H04L 27/0008 |
| 2021/0351880 | A1 * | 11/2021 | Hadani | H04L 27/2639 |
| 2022/0045890 | A1 * | 2/2022 | Hadani | H04L 27/32 |
| 2022/0085928 | A1 * | 3/2022 | Sathyanarayan | H04L 27/0008 |
| 2022/0182265 | A1 * | 6/2022 | Xu | H04L 27/26532 |
| 2022/0303163 | A1 * | 9/2022 | Ait Aoudia | H04L 27/26532 |
| 2023/0164013 | A1 * | 5/2023 | Kons | H04L 27/26532 |
| 2023/0336399 | A1 * | 10/2023 | Hadani | H04L 27/32 |
| 2023/0379194 | A1 * | 11/2023 | Priya | H04L 27/2639 |
| 2023/0412443 | A1 * | 12/2023 | Pfadler | H04L 27/2639 |
| 2024/0056343 | A1 * | 2/2024 | Sathyanarayan | H01Q 19/06 |
| 2024/0118432 | A1 * | 4/2024 | Pfadler | H04L 27/2639 |
| 2024/0163140 | A1 * | 5/2024 | Wang | H04L 27/2636 |
| 2024/0187298 | A1 * | 6/2024 | Hadani | H04L 27/2697 |
| 2024/0195547 | A1 * | 6/2024 | Sakhnini | H04L 27/2636 |
| 2024/0235915 | A1 * | 7/2024 | Lin | H04L 27/2639 |
| 2024/0267171 | A1 * | 8/2024 | Patchava | H04L 5/0007 |
| 2024/0333574 | A1 * | 10/2024 | Ryu | H04L 27/2639 |
| 2024/0364447 | A1 * | 10/2024 | Hadani | H04L 1/0023 |
| 2024/0422046 | A1 * | 12/2024 | Tusha | H04L 27/2639 |
| 2025/0007767 | A1 * | 1/2025 | Tusha | H04L 5/0037 |
| 2025/0047430 | A1 * | 2/2025 | Tusha | H04L 5/0007 |
| 2025/0055729 | A1 * | 2/2025 | Zegrar | H04L 25/022 |
| 2025/0142413 | A1 * | 5/2025 | Aygül | H04W 28/06 |
| 2025/0144660 | A1 * | 5/2025 | Sezer | B05B 15/68 |
| 2025/0158972 | A1 * | 5/2025 | Madni | H04W 12/069 |
| 2025/0240157 | A1 * | 7/2025 | Aygül | H04L 63/18 |

OTHER PUBLICATIONS

Written Opinion of the International Searching Authority for corresponding PCT/TR2021/051586, dated Jul. 27, 2022.

* cited by examiner

1

MULTI-CARRIER CONNECTION DESIGN VIA INTELLIGENT EXPLOITATION OF MULTI-USER DIVERSITY IN DELAY-DOPPLER DOMAIN

TECHNICAL FIELD

Present invention relates to a multicarrier (MC) connection design via an intelligent exploitation of the multi-user diversity in delay-Doppler domain.

Overall, the technology presented in the invention can play a key role as an enabler technology toward 5G and beyond communications systems with applications of NR-Lite, mMTC, eMBB, URLLC and SURLLC.

The method of invention provides a novel scheduling algorithm for multi-user with orthogonal time frequency space (OTFS) signaling that assigns the radio resources to the users with the largest channel diversity in accordance with the user's demands.

PRIOR ART

In $5^{th}$ generation (5G) and beyond wireless networks, the necessity for the design of new wireless technologies has become inevitable in order to cope with the anticipated exponential growth in the volume of data traffic, high throughput, power efficiency, and spectral efficiency with a wide range of applications and use cases. In particular, these new demands include New Radio Lite (NR-Lite), massive Machine-Type Communications (mMTC), enhanced Mobile Broadband (eMBB), Ultra-Reliable Low-Latency Communications (URLLC), and Secure URLLC (SURLLC). NR-Lite is to support low-power and low-data rate services that will address connections between 5G networks and IoT devices such as asset tracker, sensors, and wearables. Applications with mMTC require development of new networks to enable the massive connectivity of a large number of machine type users with sporadic transmission, small packets, and limited power usage. In eMBB, it is required to facilitate the evolution of existing 4G architecture towards a higher data rate. URLLC is the most critical use-case of next generation wireless systems with its strict demands of both high reliability and low latency. Moreover, new services with not only URLLC requirements but also services with strict security named as SURLLC are emerging. In this way, a comprehensive design of new radio wireless networks has become inevitable in order to support these various demands of future information technologies.

The most prominent technologies of the wireless industry depend on time division multiplexing (TDM) and orthogonal frequency division multiplexing (OFDM) that are characterized by a strong time and frequency selectivity resilience, respectively. Moreover, the time and frequency selectivity of the wireless systems relies on the interaction of the wireless channel with the propagating signal. Differently speaking, the received signal experiences time and frequency dispersion in case of frequency and time selective wireless environment, respectively, which cause inter-symbol interference (ISI) and inter-carrier interference (ICI) in conventional communication technologies. Therefore, the overall system performance of OFDM-based and TDM-based wireless technologies is definitely limited by this interference in the case of a doubly dispersive wireless channel, which is inevitable in future wireless scenarios (i.e., mobility in the environment with respect to transmitter, receiver or obstacles). It is worth mentioning that doubly dispersive channel represents the scenario with dispersion of the wireless channel not only in frequency but also in the time domain. Motivated from this, the aforementioned two-dimensional (2-D) OTFS signaling scheme has been proposed and heavily discussed by both literature and industry in order to cope with the selectiveness of doubly dispersive wireless environment.

To the best of the inventors' knowledge, the significance of the multi-user diversity on OTFS transmission has not yet been investigated and discussed in the literature. Therefore, the invention adaptively exploits channel diversity of each UE with OTFS transmission in order to maximize the error performance of the overall system considering the aforementioned user needs and services.

It is worth mentioning that this work is the first study that utilizes multi-user channel diversity to improve and manage the overall error performance of OTFS-based wireless system. Basically, the existing works only focus in the mitigation of the interference between users with OTFS transmission due to the sparse representation of wireless channel in delay-Doppler. However, these works do not consider the channel diversity as a performance key indicator in OTFS-based wireless networks.

The current solutions that have been proposed by academia and industry for the exploitation of channel diversity of multi-user transmission in the conventional multi-carrier systems are limited to single domain based multi-carrier signals or waveforms. Hence, OFDM-based multi-carrier technologies exploit on frequency domain selectivity and TDM-based techniques can exploit the time-domain diversity.

Regarding the aforementioned solutions proposed in the prominent wireless technologies, none of these techniques are designed for doubly-disupervise wireless channel, and thus, the validity of these solutions is limited. In other words, the solutions of the prior art have been designed to explore multi-user diversity of single domain communication systems only including frequency domain and time domain. In this regard, the 2-D waveform OTFS needs solutions that can treat and exploit the multi-user diversity from a multi-domain prespective.

Aim of the Invention

The main purpose of this invention is to develop a suitable algorithm that can provide a maximum overall system error performance for the users performing OTFS-based communication via exploitation of the channel richness and interference resilience. Consequently, this frame design can play a critical role as an enabler for the inevitable upcoming technologies such as driving autonomous cars, remote surgery, smart city and agriculture as well as intelligent transportation, and thus, improving our life in general.

A more specific purpose of the invention is to exploit multi-user diversity in delay-Doppler domain based communication technologies for 5G and beyond use-cases and applications while maximizing link reliability.

The inventors also aim to exploit channel richness and/or interference resilience in delay-Doppler domain and to determine the inter-user interference in delay-Doppler domain regarding the channel richness to ensure the desired signal-to-interference and noise ratio (SINR)

BRIEF DESCRIPTION OF THE INVENTION

The invention relates to a method for a multicarrier (MC) connection design via an intelligent exploitation of the multi-user diversity in delay-Doppler domain, in a system with a single OTFS cell with $N_u$ active users that are served by one base station (BS) in downlink transmission and the scheduling of the user equipment (UEs) is organized on a slot-by-slot basis, where a queue of packets is stored at the BS for each UEs wherein said method comprises the steps of;

i. Employing an algorithm with the objective function given as;

max(Pu),uε[1,2,3, . . . ,Nu], where Nu is the number of the UEs and wherein the algorithm gives priority for transmission to the UE with the maximum number of channel taps, herein $P_1$ is the number of channel taps of a given user, ii. Applying inverse symplectic fast fourier transform (ISFFT), iii. Converting the data symbols to time-frequency domain through applying N-point inverse Fast Fourier Transform (IFFT) and M-point FFT operation over the rows and columns of X, respectively iv. Performing Heisenberg transform by using M-point IFFT over time-frequency data symbols v. Adding a cyclic prefix (CP) of L length in order to mitigate the inter-symbol interference between the OTFS signals where L denotes the number of channel paths, wherein after the transmission the OTFS signal undergoes the time-varying wireless channel vi. Removing the CP at the receiver side to recover the transmitted signal, vii. Performing Wigner transform to recover the time-frequency representation of the signal viii. Performing SFFT operation to get the received signal in the delay-Doppler domain.

ix. Mapping the received symbols to data information after performing channel equalization.

The use of multi-user channel diversity in the delay-Doppler domain on OTFS has not been suggested before, therefore employing the multi-user channel diversity in the delay-Doppler domain renders the method of invention unique in comparison to prior art methods.

The equalization process is performed after the SFFT operation and to perform the equalization process, the effective channel in delay-Doppler domain and conventional equalization schemes such as minimum mean square error (MMSE) has been used.

In this method the flexibility provides better delay-Doppler resolution which in turn improves the reliability of the system by allowing more diversity. Also, the presence of link selection for wireless OTFS systems enables better exploitation of the multi-user channel diversity. In the process of the invention the user with largest number of paths is selected for transmission.

Figure 1:
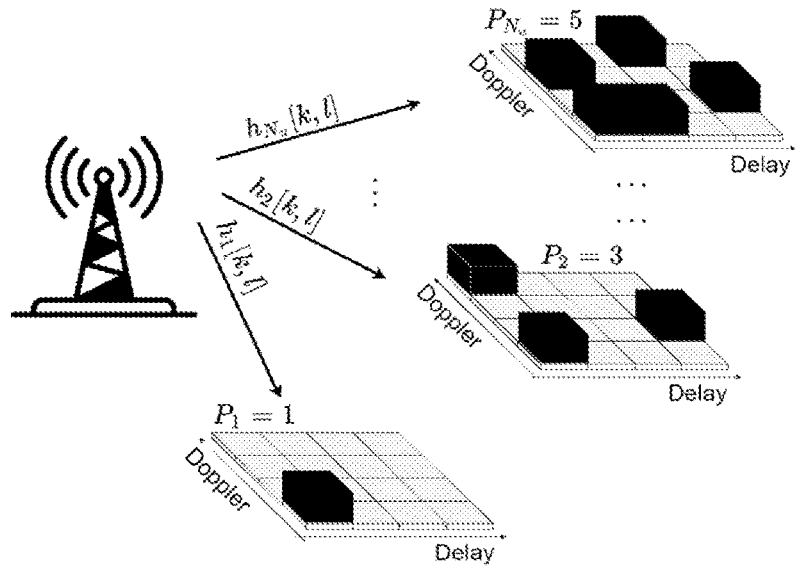
FIG. 1: Scheme showing Invention for Multi-user OTFS system in downlink transmission $P_1$: The number of channel taps for the UE number 1

$P_2$: The number of channel taps for the UE number 2

$P_{Nu}$: The number of channel taps for the UE number $N_u$ $H_1[k,l]$: The channel gain for the UE number 1 in delay-Doppler grid with indices k,l $h_2[k,l]$: The channel gain for the UE number 2 in delay-Doppler grid with indices k,l $h_{Nu}[k,l]$: The channel gain for the UE number $N_u$ in delay-Doppler grid with indices k,l FIG. 2: Block diagram of the proposed design for OTFS system in doubly dispersive channel A: Time-frequency domain B: Delay-Doppler domain

201: ISFFT

202: Heisenberg Transform

203: Wireless channel

204: Wigner transform

205: SFFT $x[k,l]$: k,l-th element of X $s[n,m]$: transmitted signal in time-frequency domain $x(t)$: transmitted signal in time domain $y(t)$: received signal in time domain $r[n,m]$: received signal in time-frequency domain $y[k,l]$: received signal in delay-Doppler domain

DETAILED DESCRIPTION OF THE INVENTION

As mentioned above, the invention relates to a method for a multicarrier (MC) connection design via an intelligent exploitation of the multi-user diversity in delay-Doppler domain, in a system with a single OTFS cell with $N_u$ active users that are served by one base station (BS) in downlink transmission and the scheduling of the user equipment (UEs) is organized on a slot-by-slot basis, where a queue of packets is stored at the BS for each Ues wherein said method comprises the steps of;

i. Employing an algorithm with the objective function given as max(Pu),uε[1,2,3, . . . ,Nu], where Nu is the number of the UEs and wherein the algorithm gives priority for transmission to the UE with the maximum number of channel taps, herein $P_1$ is the number of channel taps of a given user, ii. Applying inverse symplectic fast fourier transform (ISFFT), iii. Converting the data symbols to time-frequency domain through applying N-point inverse Fast Fourier Transform (IFFT) and M-point FFT operation over the rows and columns of X, respectively, iv. Performing Heisenberg transform by using M-point IFFT over time-frequency data symbols v. Adding a cyclic prefix (CP) of L length in order to mitigate the inter-symbol interference between the OTFS signals where L denotes the number of channel paths, wherein after the transmission the OTFS signal undergoes the time-varying wireless channel vi. Removing the CP at the receiver side to recover the transmitted signal, vii. Performing Wigner transform to recover the time-frequency representation of the signal viii. Performing SFFT operation to get the received signal in the delay-Doppler domain ix. Mapping the received symbols to data information after performing channel equalization.

Herein within the method of the invention, the inventors provide a novel scheduling algorithm for multi-user with orthogonal time frequency space (OTFS) signaling that assigns the radio resources to the users with the largest channel diversity in accordance with the user's demands.

For the application of the method of invention a single OTFS cell with multi active users ($N_u$) that perform communication with one base station in downlink transmission is considered.

In the method of the invention, the proposed algorithm in step (i) gives priority for transmission to the UE with the maximum number of channel taps.

In a preferred embodiment of the invention, for the method of the invention, a system of single antennas at both the transmitter (Tx) and the receiver (Rx) is considered.

Figure 2:
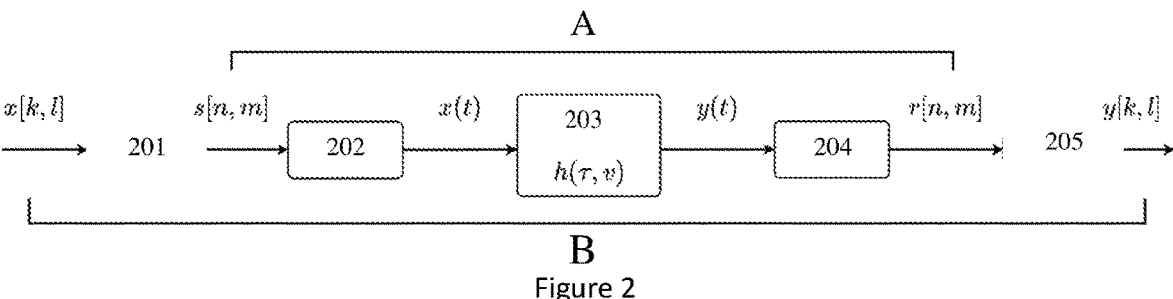

The system frame consists of N number of symbols and M number of subcarriers with T symbol duration and $\Delta f$ subcarrier spacing (SCS), respectively. Therefore, the OTFS frame occupies a total bandwidth of B=M$\Delta f$ with a frame duration of $T_f$=TN. The data in delay-Doppler domain is given by x[k,l] with k and l index representing Doppler and delay, respectively. FIG. 2 illustrates the block diagram of OTFS frame for the invention.

In the method of the invention, Heisenberg transformation is performed in step (iv) to generate the time domain OTFS signal.

Also, a cyclic prefix (CP) of L length is added in step (v) to mitigate the intersymbol interference between the OTFS signals where L denotes the number of channel paths.

EXAMPLES

Example 1: Application of the Method According to Present Invention

A. In this patent, we consider a single OTFS cell with Nu active users that are served by one base station in downlink transmission, as illustrated in FIG. 1. The scheduling of the UEs is organized on a slot-by-slot basis, where a queue of packets is stored at the BS for each UE. In this invention, we propose an algorithm that gives priority for transmission to the UE with the maximum number of channel taps, which is given as follows $$\max(P_u), u\varepsilon[1,2,3,\ldots,N_u],$$ where $P_u$ is the number of channel taps of a given user.

B. Regarding the system design, we consider a system model with single antennas at transmitter (Tx) and receiver (Rx), where FIG. 1 shows the block diagram of OTFS systems. The system frame consists of N number of symbols and M number of subcarriers with T symbol duration and $\Delta f$ subcarrier spacing (SCS), respectively. Therefore, the OTFS frame occupies a total bandwidth of B=M$\Delta f$ with a frame duration of $T_f$=TN. The data in delay-Doppler domain is given by x[k,l] with k and l index representing Doppler and delay, respectively.

C. After we apply Inverse Symplectic Fast Fourier Transform (ISFFT), we convert the data symbols to time-frequency domain. Accordingly, we apply N-point inverse Fast Fourier Transform (IFFT) and M-point FFT operation over the rows and columns of X, respectively. Note that k,l-th element of X is x[k,l].

D. To generate the time domain OTFS signal, we perform Heisenberg Transform by using M-point IFFT over time-frequency data symbols. We add a cyclic prefix (CP) of L length in order to mitigate the inter-symbol interference between the OTFS signals where L denotes the number of channel paths. After the transmission, the OTFS signal undergoes the time-varying wireless channel.

E. At the receiver side, first we remove the CP to recover the transmitted signal. Later, we perform the Wigner transform to recover the time-frequency representation of the received signal. Following that, we perform SFFT operation to get the received signal in the delay- Doppler domain. After the equalization process, we map the received symbols to data information.

INDUSTRIAL APPLICABILITY OF THE INVENTION

The invention is applicable to industrialization, and it represents an algorithm that can be applied to any signal performing transmission in delay-Doppler domain to exploit multi-user diversity.

The method of the invention aims to design multi-carrier (MC) connection via an intelligent exploitation of the multi-user diversity in delay-Doppler domain and therefore this technology can play a key role as an enabler technology toward 5G and beyond communications systems with applications of NR-Lite, mMTC, eMBB, URLLC and SURLLC Around these basic concepts, it is possible to develop several embodiments regarding the subject matter of the invention; therefore, the invention cannot be limited to the examples disclosed herein, and the invention is essentially as defined in the claims. Separate embodiments of the invention can be combined where appropriate.

It is obvious that a person skilled in the art can convey the novelty of the invention using similar embodiments and/or that such embodiments can be applied to other fields similar to those used in the related art. Therefore, it is also obvious that these kinds of embodiments are void of the novelty criteria and the criteria of exceeding the known state of the art.

The invention claimed is:

1. A method for a multicarrier connection design in a system with a single orthogonal time frequency space (OTFS) with active users that are served by one base station in a downlink transmission and in which a scheduling of user equipments is organized on a slot-by-slot basis, a queue of packets being stored at the base station for each user equipment of the user equipments, the method comprising:

employing an algorithm having an objective function of $\max(Pu)$, $u\in[1, 2, 3, \ldots, Nu]$, wherein Nu is a number of the user equipments and Pu is a number of channel taps of a given user equipment, the algorithm assigning priority for transmission to the user equipment with a maximum number of channel taps;

applying an inverse symplectic Fast Fourier Transform (ISFFT) to data symbols selected by the algorithm, wherein the ISFFT converts the selected data symbols into a time-frequency domain by applying an N-point inverse Fast Fourier Transform (IFFT) to rows of the selected data symbols and applying an M-point FFT to columns of the selected data symbols;

performing a Heisenberg transform to the converted data symbols by using an M-point inverse Fast Fourier Transform over the time-frequency data symbols;

adding a cyclic prefix of a length L to the Heisenberg transformed converted data symbols, where L is a number of channel paths to a transmission of an OTFS signal;

removing the cyclic prefix after receiving the transmitted OTFS signal;

preforming a Wigner transform to the cyclic prefix removed transmitted OTFS signal to recover a time-frequency representation of the received cyclic prefix removed transmitted OTFS signal;

performing a symplectic Fast Fourier Transform to the received cyclic prefix removed transmitted OTFS signals so as to move the received signals into a delay-Doppler domain; and mapping the delay-Doppler domain received signals into received data symbols after performing channel equalization.

2. The method of claim 1, wherein the method is used in a wireless system.

\* \* \* \* \*